(12) United States Patent
Heim

(10) Patent No.: US 7,699,350 B2
(45) Date of Patent: Apr. 20, 2010

(54) SECURITY ELEMENT AND SECURITY DOCUMENT WITH ONE SUCH SECURITY ELEMENT

(75) Inventor: Manfred Heim, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 803 days.

(21) Appl. No.: 10/504,586

(22) PCT Filed: Feb. 12, 2003

(86) PCT No.: PCT/EP03/01383

§ 371 (c)(1),
(2), (4) Date: Feb. 14, 2005

(87) PCT Pub. No.: WO03/068525

PCT Pub. Date: Aug. 21, 2003

(65) Prior Publication Data

US 2005/0127663 A1    Jun. 16, 2005

(30) Foreign Application Priority Data

Feb. 14, 2002  (DE) ................. 102 06 357

(51) Int. Cl.
*B42D 15/00*  (2006.01)
*B42D 15/10*  (2006.01)
*G02B 1/10*   (2006.01)

(52) U.S. Cl. ............... 283/91; 283/94; 283/72; 359/584; 359/585

(58) Field of Classification Search ........... 283/72, 283/114, 57–59, 91, 93, 94; 428/172, 916; 359/584–585
See application file for complete search history.

(56) References Cited

U.S. PATENT DOCUMENTS

| 4,705,300 A | | 11/1987 | Berning et al. |
| 5,142,383 A | * | 8/1992 | Mallik .......................... 359/2 |
| 6,157,489 A | * | 12/2000 | Bradley, Jr. et al. ......... 359/584 |

(Continued)

FOREIGN PATENT DOCUMENTS

EP    0 756 945 A    2/1997

(Continued)

OTHER PUBLICATIONS

U.S. Appl. No. 10/504,816.*

*Primary Examiner*—Dana Ross
*Assistant Examiner*—Kyle Grabowski
(74) *Attorney, Agent, or Firm*—Rothwell, Figg, Ernst & Manbeck PC

(57) ABSTRACT

A security element 2, 4 for embedding in or application to a security document in such a way that it is visually recognizable from both sides of the security document 1, is structured in a multilayer fashion and includes two interference elements $I_1$, $I_2$ with color shift effect, a metallic reflection layer R located in between as well as, optionally, diffraction structures 8. Depending on the disposition of the layers $I_1$, R, $I_2$ and the optionally present diffraction structures 8 on a transparent substrate S the color shift effect and/or the diffractive effects are perceptible from one or from both sides of the security element 2, 4. The security element is particularly suitable as a two-sided window thread 4 and as a label or transfer element 2 above a hole 3 in the security document 1.

30 Claims, 4 Drawing Sheets

U.S. PATENT DOCUMENTS

| | | | |
|---|---|---|---|
| 6,318,758 B1 * | 11/2001 | Stenzel et al. | 283/91 |
| 6,491,324 B1 * | 12/2002 | Schmitz et al. | 283/82 |
| 6,572,784 B1 * | 6/2003 | Coombs et al. | 252/301.16 |
| 6,686,027 B1 * | 2/2004 | Caporaletti et al. | 428/195.1 |
| 6,841,238 B2 * | 1/2005 | Argoitia et al. | 428/323 |
| 2003/0129404 A1 * | 7/2003 | Argoitia et al. | 428/403 |
| 2004/0101676 A1 * | 5/2004 | Phillips et al. | 428/323 |

FOREIGN PATENT DOCUMENTS

| | | |
|---|---|---|
| WO | WO 95 10419 A | 4/1995 |
| WO | WO 01 53113 A | 7/2001 |

* cited by examiner

SECURITY ELEMENT AND SECURITY DOCUMENT WITH ONE SUCH SECURITY ELEMENT

CROSS-REFERENCE TO RELATED APPLICATION

This application is a National Phase of International Application Serial No. PCT/EP03/01383, filed Feb. 12, 2003.

1. Field Of The Invention

The invention relates to a security element as well as a security document, in particular document of value as for example a bank note, with such a security element. The invention also relates to a semifinished product for producing such a security document. In particular, the invention relates to a security element in the form of a security thread for embedding in the security document as a so-called window thread and in the form of a label or transfer element for application to the security document.

2. Description Of The Background Art

Security documents within the terms of the present invention are in particular bank notes, but also checks, check cards, credit cards, identity cards, passports, admission tickets, tickets for public transport and the like. As semifinished products for the production of the aforementioned security document for example unprinted security paper and other unprinted security document substrates are suitable.

For protection against imitation and as authentication the aforementioned security documents are typically equipped by means of embedded security threads or applied security labels or security transfer elements. Security threads in the form of window threads are widely known, for example, in connection with documents of value, such as bank notes, but are, in principle, also suitable for the use in check cards and the like. Window threads are embedded in the base material of the security document and appear periodically at the surface of the security document, so that they are visually recognizable in these "window areas". In translucent substrates a so-called incident light/transmitted light effect is the result, the security thread viewed in transmitted light appearing as a dark stripe vis-à-vis the surrounding material. In incident light, however, the security thread is recognizable only in the window areas.

One distinguishes between simple window threads which appear only on one surface and two-sided window threads which appear on both surfaces, one special case of two-sided window threads hereinafter being referred to as lookthrough window thread which is visible on both sides of the document of value at the same time. A lookthrough window thread, so to speak, spans a hole or a transparent area in the document of value. A further two-sided window thread is the security thread referred to in the following as alternating window thread which is alternately visible on the front or the back of a document. Apart from security threads there is also the possibility for using so-called transfer elements as security elements, these usually spanning gaps, for example a hole, in a document.

The security elements have complex, visually and/or automatically testable security features which can only be imitated with great efforts. As to additionally increase the protection against forgery, such security elements often have several different security features which can also have, when combined, a new common effect.

One security feature which can often be found in security elements is a multilayer dichroic coating, whose color effect changes depending on viewing angle and/or the viewing in transmitted light or incident light. This phenomenon is based on interference effects due to the overlapping of multiple reflections and/or multiple transmissions of light waves within the layer structure in combination with selective absorption properties of the layer materials. The change of color from varying viewing angles is also called color shift effect. The change of color when viewed alternately in incident light and in transmitted light, in contrast, is hereinafter referred to as color change effect.

Optical interference coatings with color shift effect in connection with security elements are described in, for example, EP 0 395 410 B1, EP 0 341 002 B1, WO 01/03945 A1 and U.S. Pat. No. 3,858,977. Depending on kind and number of layers in the layer structure 2, 3, 4 or more color effects depending on the viewing angle can occur. The reflection and transmission properties of such color shift effect layers depend on several factors, in particular on refractive indices, absorption coefficients and layer thicknesses as well as on the number of layers in the layer structure. It is equally known to integrate the interference layers in a security element all over or, however, as described for example in WO 00/31571 A1, to break down into tiny flakes and to mix these with printing ink.

Although security elements with dichroic coating have already been proposed, there is still a need for security elements improved in contrast to the already existing security elements.

SUMMARY OF THE INVENTION

It is therefore the problem of the present invention to provide security elements, in particular a security thread or a transfer element, which, compared to prior art, have an enhanced forgery-proofness.

This problem is solved according to the invention by a security element as well as a security document or a semifinished product with the features of the independent claims. In claims dependent on these are specified advantageous developments and embodiments of the invention.

According to that the multilayer security element has an interferential layer structure which produces a color shift effect on both the front as well as the back of the security element when the security element is viewed from different angles. Here the color shift effect on the front and back of the security element can be designed in the same way but also differently.

Due to the complex multilayer structure of the security elements and the therefore only difficultly reproducible color shift and color change effects, they can be imitated only with great effort.

The interferential layer structure here is composed of at least two multilayer interference elements ($I_1$, $I_2$) and at least one reflection layer R.

The interference element is formed by absorber and dielectric layers located one on top of the other, wherein also several absorber and dielectric layers can be disposed alternately one on top of the other. Instead of alternating absorber and dielectric layers exclusively dielectric layers can be provided, too, adjoining layers having strongly different refractive indices so as to produce a color shift effect. The use of the absorber layers, however, is advantageous, because the color shift effect is visible better.

In principle, the interference elements $I_1$, $I_2$ can be structured in a multilayer fashion, but they each comprise preferably at least two layers, namely one absorber layer $A_1$ or $A_2$ located on the outer side and one dielectric layer $D_1$ or $D_2$ located between the respective absorber layer and the inner reflection layer R. As absorber layers $A_1$, $A_2$ typically serve metal layers of materials such as chromium, iron, gold, aluminum or titanium of a thickness of preferably 4 nm to 20 nm.

Compounds such as nickel chromium iron or rarer metals such as vanadium, palladium or molybdenum can also be used as materials for absorber layers. Further suitable materials are specified for example in WO 01/03945 A1, e.g. nickel, cobalt, tungsten, niobium, aluminum, metal compounds such as metal fluorides, metal oxides, metal sulphides, metal nitrides, metal carbides, metal phosphides, metal selenides, metal silicides and compounds thereof, but also carbon, germanium, cermet, iron oxide and the like.

The absorber layers $A_1$, $A_2$ of the interference elements can have the same or different thicknesses within the interferential layer structure and/or consist of the same or different absorber materials.

For the dielectric layer $D_1$, $D_2$ mainly transparent materials with a low refractive index <1.7 are considered, such as for example $SiO_2$, MgF, SiOx with 1<x<2 and $Al_2O_3$. In principle, nearly all transparent compounds which can be vapor-deposited are possible, therefore in particular also higher refracting coating materials such as $ZrO_2$, ZnS, $TiO_2$ and indium tin oxides (ITO). Further materials suitable for the dielectric layers $D_1$, $D_2$ are specified for example in WO 01/03945 A1. The layer thickness of the dielectric layers $D_1$, $D_2$ is in a range of 100 nm to 1000 nm, preferably 200 nm to 500 nm.

The dielectric layers of the interference elements can have the same or different thicknesses within the interferential layer structure and/or consist of the same or different dielectric materials.

Preferably the interference elements are designed differently within the interferential layer structure, so that they each produce different color shift effects.

Instead of absorber layers $A_1$, $A_2$ also dielectric layers can be used, the refractive index n of adjoining dielectric layers having to be greatly different, on the one hand n <1.7 and on the other hand n>1.7 so as to cause a distinct color shift effect. Since with this structure for a distinct color shift effect several dielectric layers are necessary and thus the production is very expensive, the use of absorber layers is preferred.

The absorber layers $A_1$, $A_2$ and dielectric layers $D_1$, $D_2$ of the interference elements $I_1$, $I_2$ as well as the reflection layer R are preferably produced by means of a vacuum vapor deposition method on the substrate S which can form a component of the security element 1, but which can also serve only as an intermediate carrier and is removed when the security element is applied to or in an object at the latest.

Most different vapor deposition methods are suitable for the production of the layers. One methodic group is formed by physical vapor deposition (PVD) with evaporation boat, vapor deposition by resistance heating, vapor deposition by induction heating or also electron-beam vapor deposition, sputtering (DC or AC) and electric-arc vapor deposition. Furthermore, the vapor deposition can also be effected by chemical vapor deposition (CVD) as e.g. sputtering in reactive plasma or any other plasma activated vapor deposition method. In principle, there is also the possibility that dielectric layers are printed on.

The reflection layer R is preferably a metal layer for example of aluminum, silver, nickel, platinum or palladium, preferably of silver or aluminum or of another strongly reflecting metal. The better the reflection properties of the reflection layer R, the more striking is the color shift effect and the more brilliant is the possibly present diffractive effect of the relief structure.

Dependent on the thickness of the reflection layer the latter can be of an opaque but also semitransparent design. "Semi-transparency" here means translucence, i.e. the layer shows a light transmission ratio of under 90%, preferably between 80% and 20%.

Preferably, the security element has two interference elements which are separated from each other by a reflection layer, the interference elements each producing a color shift effect from different viewing angles. With a semitransparent reflection layer possibly also a color change effect is recognizable. If the security element comprises a preferably transparent substrate, then the interference elements and the reflection layer R in this variation are located on the same side as the substrate. If it is desired to have the two interference elements on different sides of the substrate, then two reflection layers have to be used. The security element then consists of the following layer order interference element ($I_1$)/reflection layer ($R_1$)/substrate (S)/reflection layer ($R_2$)/interference element ($I_2$).

The structure of the interference elements can be identical or different, so that the interplay of colors depending on the viewing side of the security element is the same or different. Different color shift effects are preferred. Different effects result, for example, from a variation of the materials used in the interference elements and reflection layers and/or from a variation of the layer thicknesses of the individual layers which form the interference elements or reflection layer. The color intensity of the color shift effect to be viewed is maximal, which is due to the reflecting metal layer disposed behind the interference element, so that this security feature is simply visually testable.

Furthermore, the security element can in particular have diffraction structures, which overlap at least partly with the reflection layer. For the optical effect of the diffraction structures, too, the reflection layer has an intensifying effect, so that this security feature, too, is simply visually testable.

As diffraction structures for example refraction patterns, transmission, volume or reflection holograms, but also grating structures are considered which are preferably component of the substrate carrying the interference elements and the reflection layer, but which can also be placed in every other suitable layer or in an additional layer. The additional layer can be e.g. a lacquer layer.

Preferably, the diffraction structures are placed, in particular embossed, as a reflection hologram in the surface of a transparent plastic substrate which forms the security element, the reflection layer forming the reflective background for the reflection hologram. The two interference elements with the reflection layer located in between can both be present on one side of the plastic substrate, either on the surface in which the relief structure is embossed or on the opposite, flat side of the substrate. However, the interference layers can also be disposed on opposite sides of the substrate, then one reflection layer having to be present on the substrate surface with relief structure and on the opposite, flat surface of the substrate. Thus there arise several variations which have different visual effects and therefore can be preferred, depending on the use, to a greater or lesser extend.

From both viewing sides the optical effect of such a security element is substantially determined by the color effect of the interference elements. If diffraction structures are additionally used, at least from one viewing side, with a suitable layer structure also from both viewing sides, the optical appearance can be substantially determined by the optical effect of these diffraction structures. In this case the effects of the two security features overlap each other.

Therefore, such a security element is particularly suitable as a two-sided security thread, since from each viewing side particularly characteristic security features can be recognized which are visually testable. Such a two-sided security thread can be used as an alternating security thread which comes to the surface or is at least visible at different spots on the opposite surfaces of the security document. But it can also be used as a lookthrough window thread where it is visible from both document sides in a particularly thin or transparent document area or where it spans a hole in the document.

Such a security element, however, is also suitable as a transfer element, e.g. in the form of a label or patch which is put above a hole on a surface of the security document. Viewed from one side of the document the optical impression arises that it is a patch with color shift effect. Viewed from the other side through the hole of the document a part of the patch with another or possibly also an identical color shift effect is visible, wherein it depends on the exact layer structure of the security element whether a possibly present diffraction design is visible from both sides or only from one side.

As "transfer element" within the terms of this invention is described a security element which is prepared on a separate carrier layer, for example a plastic film, in reverse order compared to the order later put on the security paper and then is transferred with the help of an adhesive layer or lacquer layer of the desired outline to the security paper. The form of the security element is not limited and any outlines are thinkable up to filigree structures such as guilloches etc. are possible. Frequently, the security elements are also formed as stripes which run in parallel with the edges of the document of value. After the transfer the carrier layer can be peeled off from the layer structure of the security element or remain as a protection layer as firm component of the security element on the layer structure.

The individual transfer elements can be prepared on the carrier layer as separate single elements having the outlines to be transferred. Alternatively, the layer order of the transfer elements is provided in continuous form on the carrier layer. Such carrier layers with individual transfer elements located at a distance to each other or a continuous layer structure are hereinafter referred to as "transfer material", and the layer order of the security element disposed on the carrier layer as "transfer layer".

In case of the continuous transfer layer the transfer material is then connected to the security paper via an adhesive layer and the adhesive layer is activated via respective embossing tools, so that the transfer layer only in the activated areas is bonded to the security paper. All other areas are then peeled off with the carrier layer. Alternatively, the adhesive layer, too, can have the form of the security element to be transferred. As adhesives preferably hot-melt adhesives are used. But also any other adhesives, such as reaction lacquers, can be used.

The security element structured according to the invention can be combined with further security features, in particular with a negative or positive writing by local removal of reflection layer and/or the interference element. In a multilayer interference element structure at least one and up to all layers can be locally removed. With an interference element which, for example, consists of at least one absorber and at least one dielectric layer the gaps are preferably in the absorber layer. In case two interference elements are placed in a security element, each can be of different design. E.g. in one interference element numbers can be incorporated and also made visible by means of gaps in the absorber layer, in the other interference element letters by means of gaps in the absorber layer. Here no limits are set to the design-related possibilities. The writing preferably represents alphanumeric characters but is not restricted to that. Within the terms of the invention this can be every pattern, symbol or coding that can be represented. Due to the gaps in the layer structure an additional incident light/transmitted light effect is the result. Due to the twofold interference coating this effect is especially pronounced, since in incident light the patterns, symbols or codings are substantially more hidden than with an only simple interference coating. In transmitted light, however, the gaps are recognizable as lighter areas in dark surroundings.

By local removal of the reflection layer and, optionally, the interference element, the security element becomes, according to the design of the individual layers, partially transparent or semitransparent.

BRIEF DESCRIPTION OF THE DRAWINGS

These properties and the individual advantages of the particular variations are described in the following with reference to the accompanying figures. The proportions shown in the figures do not necessarily correspond to the dimensions present in reality and primarily serve for the improvement of clarity.

DETAILED DESCRIPTION OF THE INVENTION

The technical explanations for the individual figures are not restricted to the embodiments shown in the respective figures, but also serve as explanations for the general inventive idea.

Figure 1:
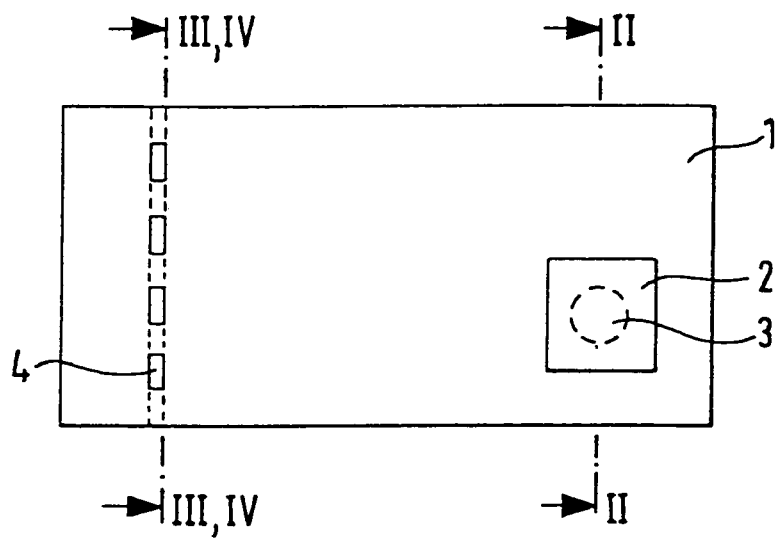
FIG. 1 shows a security document with a security element applied to a surface above a hole of the security document and with integrated security element as window thread.

FIG. 1 shows a security document 1, for example a bank note made of paper or an identity card made of plastic, which is equipped with two security elements 2, 4. The first security element 2 is a patch, which is applied to a surface of the document 1 as label or transfer element above a hole or any other transparent area 3 of the document 1, for example by means of an adhesive. The second security element 4 is a two-sided window security thread, which is embedded in the document 1 either alternatingly or as a lookthrough window thread.

Figure 2:
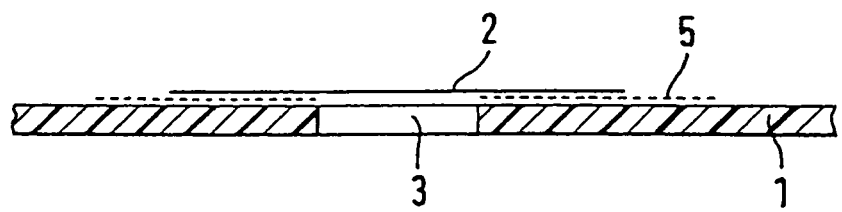
FIG. 2 shows a cross-section of the security document of FIG. 1 along the line II-II.
Figure 3:
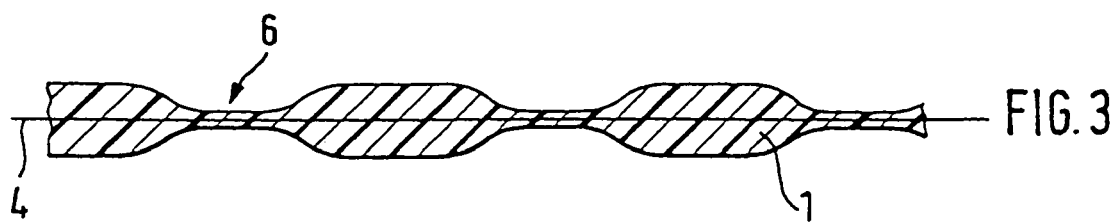
FIG. 3 shows a cross-section of the security document according to FIG. 1 along the line III-III with lookthrough window thread.
Figure 4:
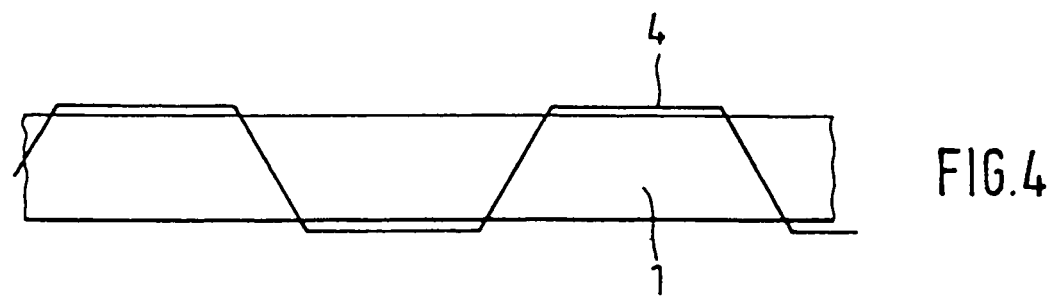
FIG. 4 shows a cross-section of the security document according to FIG. 1 along the line IV-IV with two-sided, alternating window security thread.

In the FIGS. 2 to 4, by way of example, the different types of application and embedding of the security elements 2 and 4 are shown. FIG. 2 shows the security document 1 of FIG. 1 in cross-section along the line II-II through the patch. The area surrounding the hole 3 of the document 1 has a print 5, which is covered by the patch 2. The hole e.g. can be produced as early as at the time of the paper production by papermaking or later be punched into the paper. Due to the metallic reflective layer in the layer structure of the security element 2 this print 5 is hidden under the patch 2. One advantageous design of the invention therefore provides, that the reflection layer in this area is semitransparent or even not present, so that the patch 2 is transparent or at least semitransparent, so as to the print 5 hidden thereunder can be recognized at least from certain viewing angles. Apart from that the patch 2 in the area of the hole 3 is visible from both sides.

FIG. 3 shows the window security thread of FIG. 1 as lookthrough window thread. Furthermore, the document 1, for example a bank note, shows window areas 6, which are formed very thinly and in the extreme case as a hole, so that the security thread 4 is visible from both sides of the document 1. The lookthrough window areas 6 thus have the same function for the lookthrough window thread 4 as the hole 3 for the patch 2.

FIG. 4 shows the window security thread 4 as an alternating two-sided window security thread in a document 1, which here for example is an identity card made of plastic. It is possible for example to punch flaps out of such a card, which can be bent out of the card plane to permit the security thread 4 to be threaded in, and which then move back in the plane of the card due to their own elasticity, so that the thread 4 is integrated in the card as an alternating two-sided window thread.

Methods for embedding a two-sided alternating window thread, for example in bank notes, are known to the person skilled in the art.

In the FIGS. 5 to 8 are shown different layer structures of the inventive security element 2 or 4 partially in cross-section.

Figure 5:
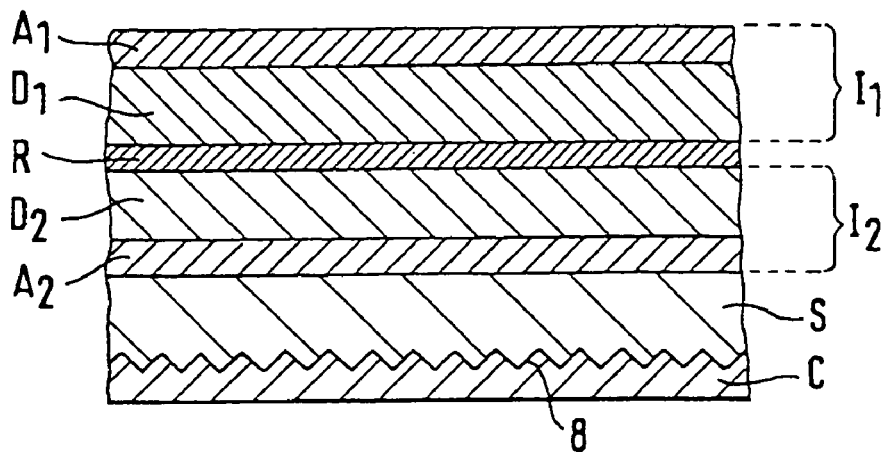
FIG. 5 shows the layer structure of a security element according to a first embodiment.

FIG. 5 shows a layer structure, in which are disposed two interference elements $I_1$ and $I_2$ with a metallic, opaque reflection layer R in between on one side of a substrate S located on top of each other and adjoining each other. In the opposite substrate surface is embossed a holographic relief pattern 8. Alternatively, the relief pattern 8 can also be embossed in an additional lacquer layer, the lacquer layer being present on one of the two sides of the substrate. The relief pattern 8 which is sensitive to mechanical load is protected against environmental stress by an optional protection layer C.

The interference elements $I_1$ and $I_2$, each consisting of one absorber and one dielectric layer, show a dichroic color shift effect from different viewing angles, for example a change between green and magenta red. When the same materials and the same layer thicknesses are used for the respective absorber layers $A_1$ and $A_2$ as well as for the dielectric layers $D_1$ and $D_2$, the security element shows the same color shift effect on the front and the back.

If such a security document is viewed from the upper interference element $I_1$, due to the metallic reflection layer R a brilliant color shift effect is perceptible. Holographic effects do not occur on the viewing side. When the same security element is viewed from the opposite side, i.e. from the substrate side, a diffractive effect produced by the diffraction structure 8 as well as the color shift effect is perceptible. Altogether, a layer structure according to FIG. 5 therefore results on one viewing side in a hologram effect combined with a color shift effect, and on the other viewing side in a color shift effect without overlapping diffraction effects.

Figure 6:
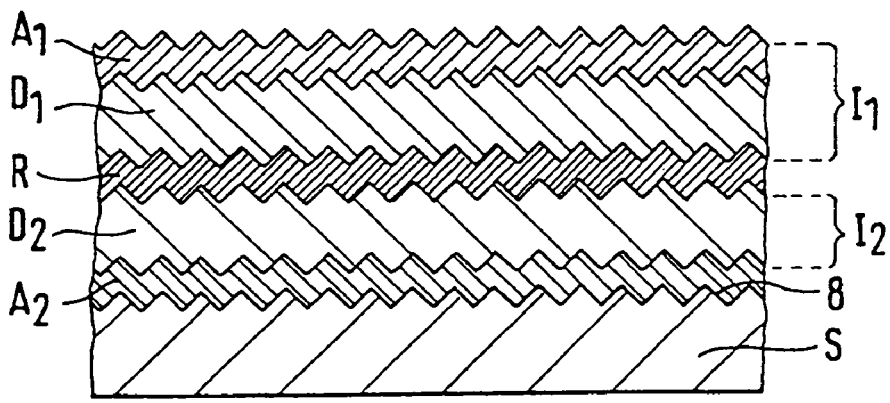
FIG. 6 shows the layer structure of a security element according to a second embodiment.

FIG. 6 shows a similar layer structure according to a second embodiment of the invention, which differs from the layer structure explained with reference to FIG. 5 in that the relief structure 8 immediately adjoins the lower interference element $I_2$. Since the interference elements $I_1$, $I_2$ each only have a layer thickness of under 1 μm (the Figures merely show a schematic layer structure), the reflection layer R has the same relief pattern as the relief structure 8 on which the layers are vapor-deposited. As a result of this the holographic effects caused by the relief structure 8 are visible, in contrast to the layer structure according to FIG. 5, from both viewing sides. In case in a layer structure according to FIG. 6 the interference elements $I_1$ and $I_2$ are structured identically, such a security element can be used particularly well as a two-sided security thread, since the diffractive effect and the color shift effect are nearly identical on both sides. Therefore, when embedding the security thread the trueness to side can be disregarded.

Figure 7:
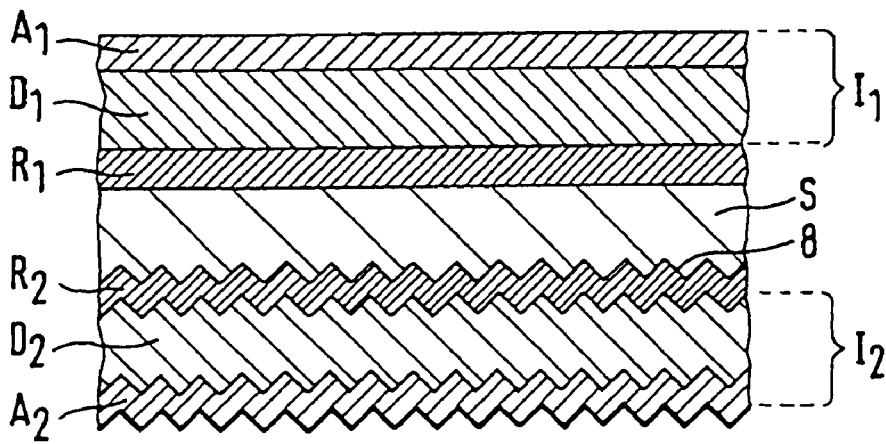
FIG. 7 shows the layer structure of a security element according to a third embodiment.

FIG. 7 shows a layer structure according to a third embodiment of the inventive security element, in which the interference elements $I_1$ and $I_2$ are disposed on opposite sides of the substrate S. In this embodiment two metallic reflection layers $R_1$ and $R_2$ are located each on one side of the substrate, the reflection layer $R_2$ being located on the side of the substrate which has the relief structure and the reflection layer $R_1$ being located on the flat side of the substrate S opposite to the relief structure 8. The consequence of this is that the hologram effect again is only visible on one side, similar to the embodiment according to FIG. 5. When the security element is viewed from the side bearing the interference element $I_1$, no diffractive effect is visible, when viewed from the side bearing the interference element $I_2$, however, such an effect is visible. Since, however, the interference layer $I_2$ in this embodiment is located in front of the relief structure 8, here a color shift effect is visible from both sides of the security element. The interference elements $I_1$, $I_2$ can be structured differently, so as to obtain different color shift effects. When producing this embodiment the individual layers can be vapor-deposited on the particular substrate side. But, however, at first also two films can be vapor-deposited each with one reflection layer and one interference element. After that these vapor-deposited films are laminated so that the vapor-deposited sides are facing outwardly.

In an alternative embodiment the diffraction structures could also be embossed in both surfaces of the substrate according to FIG. 7, so that the diffractive effect is visible from both viewing sides. In this case there is even the possibility for embossing different diffraction structures on each of the two substrate sides, so that, depending on the viewing side, different diffraction patterns can be perceived.

Figure 8:
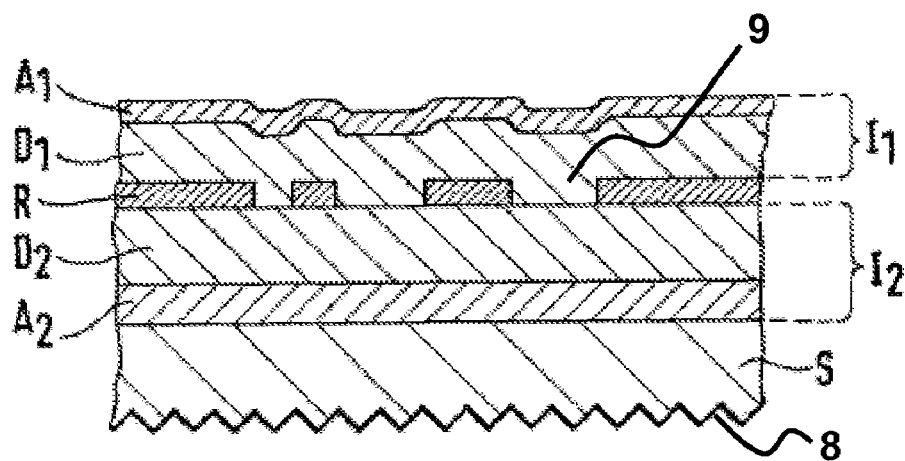
FIG. 8 shows the layer structure of a security element according to FIG. 5 with gaps in the reflection layer.

FIG. 8 shows a design of the invention with a layer structure according to FIG. 5, in which the metallic reflection layer R has gaps 9, so that the security element in the area of the gaps 9 is transparent or at least semitransparent. The result is an incident light/transmitted light effect. In case such a security element is embedded for example as a security thread in a bank note, then the gaps 9, which can have the form of symbols, patterns or codings, are hardly perceptible in incident light. When viewed in transmitted light, however, they stand out as light areas from the otherwise dark-looking security thread. When viewed from the substrate side S, the following effects are perceptible: In incident and transmitted light the color shift effect is visible. Additionally, in transmitted light the gaps can be recognized. Due to the diffraction structures (8) in incident light or in transmitted light the diffractive effects are visible in the areas which are backed by the reflection layer. In transmitted light the diffractive effects in the areas of the gaps recede distinctively up to totally. Viewed from the side opposite to the substrate, the diffractive effects are not visible. In incident light and transmitted light the viewer perceives the color shift effect, in transmitted light additionally the gaps.

In general and in all described embodiments the substrate S is preferably transparent, possibly colored transparent or colored transparently coated. The substrate S is preferably a flexible plastic film, which after the embossing of the relief structure 8 and after the coating with the interference elements $I_1$, $I_2$ and the reflective metal layer in between is cut into bands, threads, or labels. The substrate S can also be present on a transfer film and be transferred to the document by transfer method, for example by hot stamping method. Therefore, additionally to the layer structures according to FIGS. 5 to 8 further protection layers and in particular adhesive layers and cover layers can be provided, so as to be able to either bond the security element as a label to an object after the removal of the cover layer, or transfer it as a transfer element by means of the transfer method.

The gaps 9 of the reflective metal layer R can be produced by laser ablation. But the substrate S can also be printed with a soluble ink in the area of the gaps 9 before the metallic reflection layer R is vapor-deposited, and in a subsequent process the soluble ink can be dissolved out together with the metallic reflection layer R on top of it. The expert knows a number of further methods for producing the gaps 9.

The dissolving out of the metal layer R in the area of the gaps 9 can also be effected after the completed coating of the substrate S, so that not only the reflection layer R but also the adjoining interference elements $I_1$ and optionally $I_2$ are removed, too. In this way it can be achieved that the gaps appear totally colorless in transmitted light.

Figure 9:
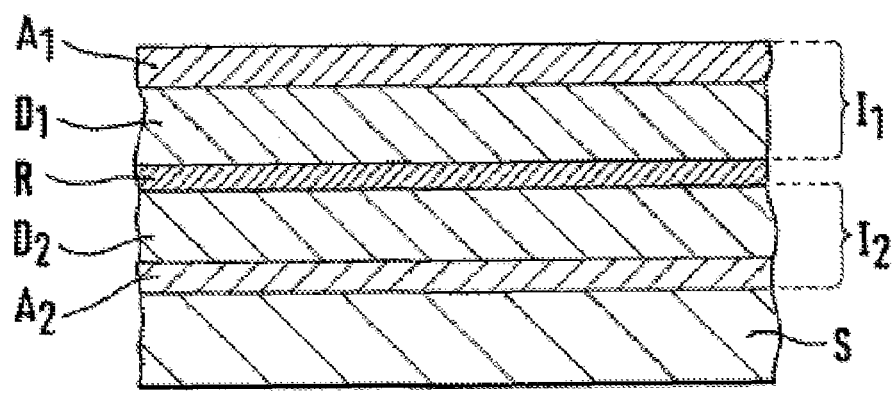
FIG. 9 shows the layer structure of a security element according to a fourth embodiment.
Figure 10:
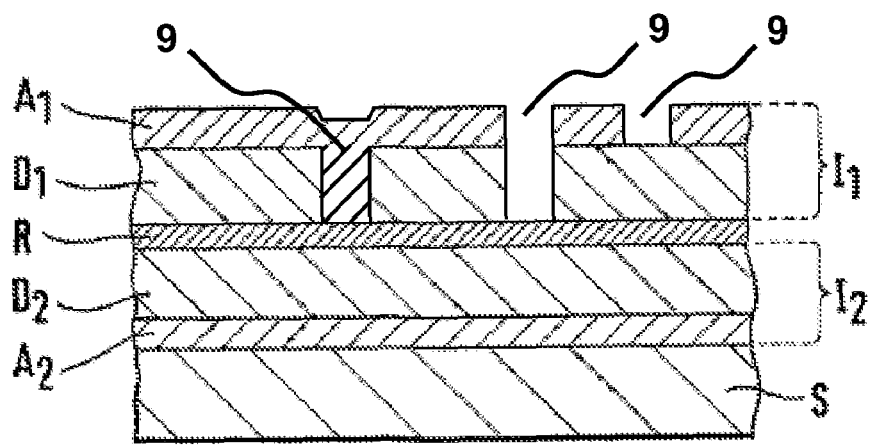
FIG. 10 shows additional embodiments of the layer structure of a security element.

FIG. 9 shows a design of the invention with a layer structure according to FIG. 5 but without relief pattern in the substrate and without protection layer (C). The metallic reflection layer R is designed semitransparently, so that the security element itself is semitransparent. This means that the viewer in this embodiment, too, perceives a color shift effect on both sides of the security element, possibly additionally a color change effect. In case the interference elements $I_1$ and $I_2$ are designed differently, i.e. they produce different color shift effects or color change effects, they overlap each other due to the semitransparency of the reflection layer R, and in that way complex forms of appearance of the security element can be generated. In case the interference element $I_1$ produces a color shift effect from "magenta" to "green" and the interference element $I_2$ a color shift effect from "green" to "yellow" and one views the interferential layer structure from a certain side, both effects are visible from this side, but they overlap each other to form a total effect in which mixed colors of the individual effects can occur. Here, depending on the design, the interference element facing the viewer usually has a larger share in the total effect than the interference element which is facing away from the viewer and is weakened by the semitransparent layer.

The invention claimed is:

1. Security document, or semifinished product for the production of the security document, comprising:
a first and a second surface located opposite to each other; and
a security element, connected to the document or semifinished product such that the security element is respectively recognizable when the first and second surfaces are viewed,
wherein the security element has a substrate, a reflection layer and, on each side of the reflection layer, a respective interference element with a color shift effect, and
wherein only the reflection layer has gaps in the form of patterns, symbols or codings, whereas these gaps are covered on each side by the respective interference element wherein both of the interference elements have at least one absorber layer and at least one dielectric layer, which is located between the metal layer and the absorber layer.

2. Security document or semifinished product according to claim 1, characterized in that the security element has diffractive effects on one or on both sides.

3. Security document or semifinished product according to claim 1, characterized in that the security element has at least in partial areas diffraction structures.

4. Security document or semifinished product according to claim 3, characterized in that the diffraction structures overlap at least partially with the reflection layer or layers.

5. Security document or semifinished product according to claim 3, wherein the diffraction structures are present in a separate layer.

6. Security document or semifinished product according to claim 3, wherein the diffraction structures are embossed in a surface of the substrate or the separate layer in the form of a relief pattern.

7. Security document or semifinished product according to claim 3, wherein one of the interference elements immediately adjoins the diffraction structures.

8. Security document or semifinished product according to claim 3, wherein the or one reflection layer immediately adjoins the diffraction structures.

9. Security document or semifinished product according to claim 1, characterized in that the reflection layer is a metal layer.

10. Security document or semifinished product according to claim 1, wherein the reflection layer is opaque or semitransparent.

11. Security document or semifinished product according to claim 1, wherein the interference elements have a two-layer structure.

12. Security document or semifinished product according to claim 1, wherein the interference elements are structured differently.

13. Security document or semifinished product according to claim 1, wherein the interference elements and the reflection layer in between are disposed on one side of the substrate.

14. Security document or semifinished product according to claim 1, wherein the interference elements are disposed on opposite sides of the substrate.

15. Security document or semifinished product according to claim 1, wherein the security element is applied to one of the two surfaces and spans a hole or a transparent area of the document or semifinished product.

16. Security document or semifinished product according to claim 1, wherein the security element is at least partially embedded in the document and spans a hole or a transparent area of the document or semifinished product.

17. Security document or semifinished product according to claim 1, wherein the security element is embedded in the document or semifinished product in such a way that it is visually recognizable in first areas on the first surface and in second areas on the second surface different from the first areas.

18. Method of using the security document or semifinished product according to claim 1 for the protection of products.

19. The security document of claim 1 wherein said document is a document of value.

20. The security document of claim 19 wherein said document of value is a bank note.

21. The security element of claim 1 wherein said document of value is a bank note.

22. Security element for embedding in or application to a security document, characterized in that the security element has a substrate with at least one reflection layer and, on each side of the reflection layer, a respective interference element with color shift effect, wherein only the reflection layer has gaps in the form of patterns, symbols or codings, whereas said gaps are covered on each side by the respective interference element wherein both of the interference elements have at least one absorber layer and at least one dielectric layer, which is located between the metal layer and the absorber layer.

23. Security element according to claim 22 in the form of a security thread for embedding in a security document.

24. Security element according to claim 22 as a label or patch for the application to a security document.

25. Security element according to claim 22 as a transfer element for the application to a security document by means of a transfer method.

26. The security element of claim 22 wherein said security document is a document of value.

27. Transfer material for the application of a security element to a document of value, characterized in that the transfer material comprises the following layer structure:
   a carrier layer,
   a reflection layer, and, on each side of the reflection layer, a respective interference element with color shift effect, wherein only the reflection layer has gaps in the form of patterns, symbols or codings, whereas said gaps are covered on each side by the respective interference element wherein both of the interference elements have at least one absorber layer and at least one dielectric layer, which is located between the metal layer and the absorber layer.

28. Method for producing a document of value with a security element, characterized in that to the document of value is partially transferred the layer structure of the transfer material according to claim 27 and afterwards, optionally, the carrier layer is peeled off.

29. Method of using the transfer material according to claim 27 for the production of security elements.

30. Method for producing a transfer element for the application of a security document to a document of value, comprising:
   a) providing a carrier layer; and
   b) vapor depositing a reflection layer and, on each side of the reflection layer, a respective interference element with color shift effect, wherein only the reflection layer has gaps in the form of patterns, symbols or codings, whereas said gaps are covered on each side by the respective interference element wherein both of the interference elements have at least one absorber layer and at least one dielectric layer, which is located between the metal layer and the absorber layer.

* * * * *